United States Patent Office 3,598,770
Patented Aug. 10, 1971

3,598,770
ACRYLATE LATEX AND LATEX
FOAM PRODUCTS
Carl Moore, Midland, Mich., and Donald B. Parrish,
Lake Jackson, Tex., assignors to The Dow Chemical
Company, Midland, Mich.
No Drawing. Filed May 24, 1967, Ser. No. 640,833
Int. Cl. C08f 47/10; C08j 1/16
U.S. Cl. 260—2.5
8 Claims

ABSTRACT OF THE DISCLOSURE

A film-forming latex comprising a copolymer of (a) an $\alpha,\beta$-ethylenically unsaturated carboxylic acid, e.g., methacrylic acid, (b) a mono(hydroxyalkyl) ester of ethylenically unsaturated carboxylic acid, e.g., 2-hydroxyethyl acrylate and (c) at least one alkyl ester of an $\alpha,\beta$-monoethylenically unsaturated carboxylic acid, e.g. butyl acrylate, is prepared by emulsion polymerization. A modified, copolymer aqueous dispersion is prepared by blending the latex with an organic coreactive material, e.g. a melamine-formaldehyde resin, and optional formulating ingredients. Latex foam is prepared from the modified, copolymer aqueous dispersion, which may contain optional formulating ingredients, by frothing the resulting foam formulation, and curing and drying the wet froth thus obtained to form latex foam sponge. Other articles are obtained, for example, by applying the wet froth to a textile substrate, then carrying out the curing and drying steps.

BACKGROUND OF THE INVENTION (1) Field of the invention

This invention relates to synthetic latexes, to latex foam prepared therefrom and articles comprising latex foam adhered to a substrate, generally a textile substrate.

(2) Description of the prior art

It has been known to use synthetic latexes in the preparation of foam rubber, or foam sponge, since about the time of World War II, first in blends with natural rubber latex and later as the sole latex component. The processes and products are described, for example, in E. W. Madge, Latex Foam Rubber, Interscience Publishers, New York, 1962. More recently there has been described (in United States Patent No. 3,215,647) new synthetic latex foams which are prepared from latexes (sometimes called reactive latexes) of copolymers having reactive groups and from added water-dispersible compositions which are co-reactive therewith. In the preparation of such latex foam products, the compositions necessarily consist of the latex and the co-reactive material and often also contain other components such as foam stabilizers, pH control agents, foaming aids, thickeners, mineral fillers, antioxidants and may contain other materials such as plasticizers and other formulating agents. The resulting aqueous composition is foamed or frothed by one of various known methods such as by blowing agents, or by whipping, or by use of apparatus having commercially available foam heads. Early effects of the interaction between the latex component and the co-reactive material (sometimes called gelling or gelatin because of the paucity of short, exact, descriptive language) assist in holding the frothed composition in its cellular form until further drying and curing, usually by the application of heat, result in the desired foam product.

SUMMARY OF THE INVENTION

In the practice of the present invention, there is required a film-forming latex comprising copolymerized monomers of at least three different kinds:

(1) From about 2 percent to about 7.5 percent, preferably from about 3 percent to about 5 percent, by weight of an $\alpha,\beta$-monoethylenically unsaturated aliphatic carboxylic acid, preferably acrylic acid or methacrylic acid, or mixtures thereof;

(2) From about 2 percent to about 10 percent, preferably from about 5 percent to about 8 percent, by weight of a mono(hydroxyalkyl) ester of an $\alpha,\beta$-ethylenically unsaturated carboxylic acid, especially 2-hydroxyethyl acrylate;

(3) From about 57.5 percent to about 93 percent, preferably from about 76 percent to about 86.6 percent, by weight of at least one alkyl ester of an $\alpha,\beta$-ethylenically unsaturated carboxylic acid, a predominant portion of said ester having from 1 to 4 carbon atoms in the alkyl moiety;

(4) From 0 to about 20 percent, preferably from about 5 percent to about 10 percent, by weight of an acrylonitrile;

(5) From 0 to about 5 percent, preferably from about 0.4 percent to about 1 percent, by weight of a polyethylenically unsaturated crosslinking monomer capable of polymerizing under free radical conditions to covalently bond different chains of a polymer; all percentages being based on the total copolymer weight.

The latex is suitable for many of the applications for which earlier film-forming latexes have been used. However, they are especially valuable when blended with organic coreactive materials having more than one group per molecule which is capable of reacting with hydroxyl groups or carboxyl groups. Especially when the kind and amount of monomers copolymerized to form the latex are of the preferred composition and the latex is blended with the coreactive material, e.g., a melamine-formaldehyde resin, there are obtained highly advantageous products for the preparation of textile coatings which, after drying and curing, have improved resistance to deterioration from laundering and dry cleaning.

The blends of latex and coreactive material are particularly adaptable and especially suitable for the preparation of improved latex foam (more especially textile-backed latex foam) by foaming the blend to form a wet froth, optionally coating the wet froth onto a substrate such as a textile, then drying and curing the wet froth.

Compositions within the preferred range have the combined advantage of dry cleaning resistance and wash (laundry) resistance as well as other advantages, some of which are discussed below. Outside the preferred range, but within the operable range, some of the products have excellent dry cleaning resistance but only a good wash resistance whereas other products have good wash resistance but may be slightly sensitive to some types of dry cleaning solvents.

DETAILED DESCRIPTION OF THE INVENTION

The latex component of this invention requires copolymerized monomers including an $\alpha,\beta$ ethylenically unsaturated aliphatic carboxylic acid, a mono(hydroxyalkyl) ester of such an acid and one or more alkyl esters of an α,β-ethylenically unsaturated carboxylic acid. The preferred latexes also contain copolymerized monomers of two other classes, i.e., an acrylonitrile and a polyethylenically unsaturated crosslinking monomer capable of polymerizing under free radical conditions to covalently bond different chains of a polymer.

The α,β-ethylenically unsaturated aliphatic carboxylic acids are monoethylenically unsaturated monocarboxylic, and dicarboxylic acids having the ethylenic unsaturation alpha-beta to at least one of the carboxyl groups and similar monomers having a higher number of carboxyl groups. The amount of the carboxylic acid component in the latex is from about 2 percent to about 7.5 percent, preferably from about 3 percent to about 5 percent, by weight based on the total weight of the copolymer in the latex. It is understood that the carboxyl groups may be present in the acid (—COOH) or salt form (—COOM) and are readily interconvertible by well known simple procedures.

Specific examples of the α,β-ethylenically unsaturated aliphatic carboxylic acids are acrylic acid, methacrylic acid, fumaric acid, itaconic acid, maleic acid, various α-substituted acrylic acids such as α-ethacrylic acid, α-propyl acrylic acid, α-butyl acrylic acid, half esters of polycarboxylic acids, e.g., ethyl acid maleate, n-butyl acid maleate, and mixtures thereof. Methacrylic acid is especially preferred.

The hydroxyl-containing esters of α,β-ethylenically unsaturated aliphatic carboxylic acids advantageously are esters of acrylic acid and alpha-substituted acrylic acids (such as alpha-lower-alkyl substituted acids, especially methacrylic acid), all of which esters have a residual monohydroxy substituent in the alcohol moiety of the ester. In the hydroxyl-containing esters there are at least two carbon atoms in the chain between the hydroxyl group and any other oxygen atom. Representatives of such esters are β-hydroxyethyl acrylate, β-hydroxypropyl acrylate, β-hydroxyethyl methacrylate, β-hydroxypropyl methacrylate, 4-hydroxybutyl acrylate, 4-hydroxybutyl methacrylate and 5-hydroxypentyl methacrylate. In addition to the above representative hydroxyl-containing esters, there may also be used other similar esters of alpha-alkyl substituted acrylic acids in which the alpha-alkyl substituent has from 2 to 4 carbon atoms, or more. Thus, the radical attached to the alpha-carbon of the carboxylic acid moiety of the hydroxyl-containing ester may be hydrogen or an alkyl radical having from 1 to 4, or more, carbon atoms.

The mono(hydroxy alkyl) esters according to the above description comprise from about 2 percent to about 10 percent, preferably from about 5 percent to about 8 percent, of the total copolymer weight in the latex.

Rather than using a combination of an α,β-ethylenically unsaturated carboxylic acid and a hydroxyalkyl ester of such an acid, a monomer containing both a mono(hydroxyalkyl) ester group and a carboxylic acid group, i.e., a mono(hydroxyalkyl) ester of an α,β-ethylenically unsaturated polycarboxylic acid, may be copolymerized with the other required monomeric components to form the latex product of this invention. Representative of such dual function monomers are 2-hydroxethyl acid maleate, 2-hydroxyethyl acid fumarate, 2-hydroxypropyl acid maleate, 4-hydroxybutyl maleate and 2-hydroxyethyl itaconate. Mixtures of the above-described dual function monomers with other ethylenically unsaturated carboxylic acids and/or other hydroxyalkyl esters also may be used.

It should be recognized that the minimum amount of the hydroxyalkyl ester and the minimum amount of the carboxylic acid cannot be used in the same composition within the overall range described.

The preferred alkyl esters of an α,β-ethylenically unsaturated carboxylic acid are the lower alkyl esters of acrylic acid, especially n-butyl acrylate and ethyl acrylate. Nevertheless, other lower alkyl esters of acrylic acid, i.e., alkyl acrylates having from 1 to 4 carbon atoms in the alkyl portion, e.g., methyl acrylate, n-propyl acrylate, isopropyl acrylate and isobutyl acrylate, are also members of the preferred group. A predominant proportion of the alkyl ester component consists of the above preferred class, especially n-butyl acrylate and ethyl acrylate. A minor proportion of the alkyl ester component may be other alkyl esters of acrylic acid having 5 or more carbons in the alkyl portion, e.g., n-hexyl acrylate, 2-ethylhexyl acrylate, ethylbutyl acrylate, n-octyl acrylate, n-decyl acrylate and dodecyl acrylate. The alkyl portion may include a cyclic substituent, e.g., furfuryl acrylate. Likewise, as a minor proportion of the alkyl ester component there may be included alkyl esters of methacrylic acid such as methyl methacrylate, ethyl methacrylate, propyl methacrylate, n-butyl methacrylate, n-hexyl methacrylate, 2-ethylhexyl methacrylate, n-octyl methacrylate, n-decyl methacrylate, and dodecyl methacrylate, or alkyl esters of monoethylenically unsaturated dicarboxylic acids such as diethyl maleate, dimethyl fumarate, dibutyl maleate and dimethyl itaconate. The alkyl portion of the alkyl esters is devoid of an hydroxy group. The alkyl ester component is present in the latex in an amount from about 57.5 percent to about 93 percent, preferably from about 76 percent to about 86.6 percent, of the total copolymer weight. For a portion of the alkyl ester component there may be substituted a small amount, usually less than 10 percent based on the total weight of the polymer, of another neutral monomer such as the alkenyl aromatic compounds (the styrene compounds) such as styrene, alpha-methylstyrene, ar-methylstyrene, ar-ethylstyrene, ar-t-butylstyrene, methoxystyrene, cyanostyrene, acetylstyrene, monochlorostyrene, dichlorostyrene and other halostyrenes and vinylnaphthalenes; the halo-substituted, monoethylenically unsaturated monomers such as vinyl chloride, vinyl bromide, vinylidene chloride and vinylidene bromide; and other oxygen-containing ethylenically unsaturated monomers which are stable in aqueous media at a pH of about 6.5 such as methylisopropyl ketone, vinyl acetate, vinyl propionate, and the like.

In the preferred monomeric compositions of the invention which are polymerized, there is also an acrylonitrile component such as acrylonitrile and methacrylonitrile.

The especially preferred polymerized monomeric compositions include a crosslinking monomer which is a polyethylenically unsaturated monomer capable of polymerizing under free-radical conditions to covalently bond different chains of a polymer.

Such crosslinking monomers are represented by divinyl benzene, ethylene glycol diacrylate (sometimes called ethylene diacrylate), diethylene glycol diacrylate, triethylene glycol diacrylate, higher polyglycol diacrylates, ethylene glycol dimethacrylate, diethylene glycol dimethacrylate, triethylene glycol dimethacrylate, higher polyglycol dimethacrylates, allyl acrylate, allyl methacrylate, diethylene glycol divinyl ether, and the like.

In the preparation of the latex compositions of this invention the monomers are copolymerized at an acid pH in aqueous emulsion containing surface active agents, free-radical producing catalysts and under conditions of time, temperature, pressure, etc. in accordance with the procedures known for emulsion polymerization. Often at least one anionic emulsifier is included in the polymerization charge. If the latex product is to be used in the preparation of latex foam, non-ionic emulsifiers, when used, are limited to amounts sufficiently small as not to interfere importantly with subsequent wet froth stability during the latter stages of preperation of foam sponge. For at least a part of the emulsifier system, sodium lauryl sulfate is a preferred anionic type. However, other anionic emulsifier may be used, of which representative types are the alkali metal alkyl aryl sulfonates, the alkali metal alkyl sulfates, the sulfonated alkyl esters, and the like. Specific examples of these well-known emulsifiers (for the purpose of illustration and not for limitation) are dodecylbenzene sodium sulfonate, sodium di-secondary butyl naphthalene sulfonate, disodium dodecyl diphenyl ether disulfonate, N-octadecyl disodium sulfosuccinamate.

Optionally, other ingredients well-known in the emulsion polymerization art may be included such as chelating agents, thickeners, redox agents, buffering agents, inorganic salts and pH adjusting agents.

The polymerization is carried out batchwise, continuously or stepwise as by production of a seed latex, followed by batchwise and/or continuous addition of the remaining constituents.

While the latexes preferably are prepared by emulsion polymerization, solution polymerization or other polymerization methods may be used with subsequent conversion of the products to latex form. Alternative to the direct polymerization of all of the consituent monomers a polymer of one or more non-acidic monomers may be treated with the acidic monomer by known graft polymerization methods to obtain a graft copolymer having the requisite carboxyl groupes.

Except where indicated otherwise by the context, the term "carboxyl group" is intended to include the carboxylic acid group (—COOH) per se and the ionizable salts such as the alkali metal and ammonium salts.

In general, such groups are readily interconvertible between the ionized (salt) form and the acid form by the addition of mineral acids or of alkali metal hydroxides or ammonium hydroxide. Of course, due consideration must be given to the dispersion stability of the overall composition during such interconversion. Nevertheless, the carboxyl-containing monomers, such as methacrylic acid, are more readily polymerized in the acid (COOH) form than in the ionized (salt) form.

The latex products typically have from about 40, preferably from about 48 percent, to about 65 percent solids content, average particle sizes from about 1000 angstroms or smaller to about 4,000 angstroms, or greater, and a pH of from about 2 to about 8. The latex products dry to soft, tacky, transparent elastic films. When the latex products are to be used in the preparation of latex foam, it is often advantageous to employ such products having a wide particle size distribution or to blend a large particle size latex with a small particle size latex. The copolymers comprising the latex swell but usually are insoluble in common organic solvents such as alcohols, acetone, benzene, carbon tetrachloride, perchloroethylene, mineral spirits, or lacquer solvents. They can be prepared as soluble polymers by including conventional chain transfer agents in the polymerization step and not including the crosslinking monomer component.

Because of a highly desirable combination of properties in latex foams prepared therefrom, such as good resistance to deterioration from heat and light, from washing and from dry cleaning as well as suitable resilience and other properties providing good hand in a foam fabric-backing, an especially preferred composition for the carboxyl-containing copolymer latex component used in the practice of this invention is an aqueous collodial dispersion of a copolymer of from about 5 percent to about 10 percent by weight of an acrylonitrile, about 5 percent to about 8 percent by weight of an hydroxyalkyl acrylate, such as 2-hydroxyethyl acrylate, from about 0.4 percent to about 1 percent by weight of a polyethylenically unsaturated cross-linking monomer such as divinyl benzene or ethylene dimethacrylate, from about 3 percent to about 5 percent by weight of methacrylic acid, and from about 76 percent to about 86.6 percent by weight of a lower alkyl ester of acrylic acid such as ethyl acrylate or butyl acrylate or a mixture thereof.

Increases in tensil strength and in solvent resistance of the copolymer and the attainment of other useful and advantageous properties are achieved by blending with an acrylic copolymer latex, as described above, an organic coreactive material having more than one reactive group per molecule which is capable of reacting with the hydroxyl groups, or the carboxyl groups, or both, of the acrylic copolymer in the latex, e.g., amino groups, epoxy groups, phenolic hydroxyl groups and alcoholic hydroxyl groups. Representative of such organic coreactive materials are the aminoplast resins, the polyamines, the novolaks, the epoxidized novolaks, the liquid epoxy resins, epoxidized soybean oil and the like.

Included in the term "aminoplast resins," by way of example, are the condensation products of an aldehyde, especially formaldehyde, with urea, thiourea, biuret, dicyandiamide, and preferably the aminotriazines, such as formoguanamine, benzoguanamine, and especially melamine; and such condensation products which have been modified by alcohols, especially those alcohols having from 1 to 4 carbon atoms; employed either singly or in combination with one another. The alcohol-modified condensation products are formed by the reaction of an alcohol with the aldehyde condensation products. Such alcohol-modified resins are known by other descriptive terms such as etherified resins or alkylated resins. For example, when methyl alcohol is reacted with a melamine-formaldehyde condensate, the product is known as a methylated melamine-formaldehyde resin, or even more simply as methylated melamine resin. Such formaldehyde condensation products and their alcohol modifications are described and their methods of preparation given in Chapter VIII of Polymer Processes, Calvin A. Schildknecht, Editor, Interscience Publishers, Inc., N.Y., 1956, pp. 295–350.

The polyamines are represented by ethylene diamine, diethylene triamine, trimethylene diamine, tetramethylene diamine, hexamethylene diamine, decamethylene diamine, tetraethylene pentamine, triethylene tetramine, polyethylenimine, guanidine, formoguanamine, benzoguanamine, dicyandiamide, and especially melamine and urea.

The novolaks are acid-catalyzed, reaction products of a phenol and aldehyde. Such materials are briefly described, for example, in B. Golding, Polymers and Resins, D. Van Nostrand Co., Inc., Princeton, N.J.; 1959, pages 246, 248, 249, 251, 253, 255.

The viscous liquid reaction product of epichlorohydrin and 2,2'-bis-(p-hydroxyphenyl) propane is the preferred liquid epoxy resin. The preparation and description of that preferred epoxy resin and other operable resins of the class are given, for example, in C. E. Schildknecht, Polymer Processes, Interscience Publishers, Inc., N.Y., 1956, pages 429–436, 782–784.

The modified, copolymer aqueous dispersions are prepared by blending the acrylic copolymer latex with from about 1 part to about 10 parts or more of the organic coreactive material per 100 parts of copolymer in the latex. The preferred proportion varies somewhat with the organic coreactive material used. For example, when the coreactive material is an aminoplast resin, especially a malamine-formaldehyde resin, the preferred amount is from about 3 parts to about 6 parts per 100 parts of copolymer in the latex. With the liquid epoxy resins, the preferred proportions are from about 1 part to about 3 parts, but for other materials, e.g., epoxidized soybean oil, often ten parts or more per 100 parts of latex copolymer are used. If the organic coreactive material is water-soluble, it may simply be mixed with the latex or the resin may be added as a water solution. Conversely, if the coreactive material is not water dilutable, an oil-in-water emulsion of the material, using a solvent if necessary, is prepared according to methods well known in the art for producing oil-in-water emulsions. Such oil-in-water emulsions, however, should be prepared using emulsifiers, wetting agents, surfactants, and the like which are compatible with the latex. Similarly, the emulsifiers, or like compounds, should be compatible with the coreactive material. Such an emulsion of the organic coreactive material is then mixed with the synthetic latex.

The modified, copolymer aqueous dispersion comprises the copolymer of the latex and the coreactive organic material in the above-described proportions and the total weight of the copolymer and the coreactive organic material is from about 5 to about 65 percent of the total weight of the dispersion. The pH of such a dispersion advantageously is higher than about 2.5. The term "modified, copolymer aqueous dispersion" wherever it appears in this specification designates the mixture of the organic, coreactive material and acrylic latex as described above.

Optionally, the modified, copolymer aqueous dispersions also may contain plasticizers, stabilizers, processing aids, pigments, extenders, and the like.

The modified, copolymer aqueous dispersions may be applied to substrates or formed into thin, self-supporting films by use of equipment already devised for the handling of latexes, aqueous emulsion polymers or pastes. Representative of applicable processes are film casting by flowing out a determined thickness of the dispersion on moving belts or wheels; spread coating on webs, such as by use of the various types of knife coating; impregnation, as by applying the dispersion to porous webs at the nip of squeeze rolls; dip coating, as by dipping an article into a bath or passing a supported or unsupported substrate material through a bath containing the modified interpolymer aqueous dispersion; and mixing, as with paper pulp.

A cross-linking or curing reaction may be induced to occur in the modified, copolymer aqueous dispersion before the dispersion is spread into thin layers or applied to a suitable substrate as previously described. Usually and preferably, however, the dispersion is coated onto a suitable substrate or spread into such a layer as to give a desired film thickness before a substantial amount of cross-linking has occurred. The subsequent drying and curing steps may occur separately in the order shown or concurrently. Drying may occur at about room temperature or can be carried out at elevated temperature. Similarly, the cross-linking step occurs at room temperature with certain of the compositions within the scope of this invention.

However, the curing and drying steps are accelerated by heat and in some cases, as when alkylated aminoplast resins are used to prepare the modified, copolymer aqueous dispersion, temperatures considerably above room temperature such as from about 100° C. to about 150° C. may be required to obtain the desired amount of cross-linking. In general, the required time is inversely related to the temperature. When elevated temperatures are employed for the curing step, both the temperature and the time of heating should be limited so that adverse side effects upon the modified interpolymer and/or on any substrate are minimized, i.e., below the decomposition temperature of both. In most cases with the compositions of this invention when the substrate is a fabric backing, the limitation as to highest temperature is determined by the backing. The cured films and film coatings on textiles have good resistance to sunlight and, especially with the preferred compositions, have excellent resistance to laundering and dry cleaning solvents such as perchloroethylene and naphtha.

To prepare latex foam, the modified copolymer aqueous dispersion is usually, but not necessarily, compounded with one or more added components such as foaming aids, foam stabilizers, bactericides, dyes, thickeners, plasticizers, antioxidants and inorganic fillers such as clay, whiting, talc, mica, lithopone, titanium dioxide and the like.

Polymeric fillers such as powdered polyvinyl chloride may also be used. Polyvalent metal oxides, especially zinc oxide, which are somewhat reactive with the residual carboxyl groups, also often are used in limited amounts. Such additional formulating ingredients, especially the fillers, often are added as an aqueous dispersion having a solids content of from about 50 to about 65 percent by weight. While not required and often not used, a gelling agent of the type known in the preparation of the early latex foams may be added in the formulation of the foamable aqueous compositions.

Preferably the foamable aqueous dispersion either fully or partially formulated (often called the foam formulation) is converted to a wet froth by beating or whipping air into the aqueous dispersion, or by use of apparatus having foam heads, for example, those of the type now commercially available, some of which are suitably adapted for addition of a pre-selected kind and amount of formulating ingredient during the foaming or frothing step. Optionally, however, other methods may be used for the foaming or frothing step; for example, the injection of inert gases such as nitrogen, the liberation by chemical reaction of gases such as hydrogen, oxygen or carbon dioxide, the vaporization of volatile liquids—all under appropriate conditions such as changes in temperature, pressure and pH of the system.

The wet froth suitably is placed in molds, spread on a flat tray, coated (for example, by suitable doctoring equipment) onto either a substrate to which it will adhere or releasably onto a material or layer having a nonadherent surface such as of polytetrafluoroethylene or onto a surface, for example, a belt, which has been treated with a release agent. The early effect, usually at elevated temperatures, of the interaction of the wet froth ingredients including the carboxylic polymer, the organic coreactive material and latex, the optionally added thickener, foam stabilizers, zinc oxide and the like assist in holding the wet froth in its cellular form until drying and curing, usually by the application of heat, result in the desired foam sponge product.

The drying and curing steps, in general, follow the same principles as described supra for the similar steps in drying and curing films of the modified copolymer aqueous dispersions, although the cellular nature of the foam product and its greater thickness increase somewhat the difficulty of the removal of volatile materials and of achieving initial heat transfer, thus in some cases requiring additional time and temperature control. The time for curing at a particular temperature often is determined by measuring the temperature at the center of the foam.

The adherent substrates to which the wet latex froth is applied and to which the cured dried foam adheres are not narrowly critical as to composition. Various materials such as loosely woven netting material, glass fiber sheets (including use as draperies), woven and nonwoven fabrics of natural materials such as protein fibers, cotton, wool, and crosslinked cellulose and synthetic fibers such as of polyesters, polyamides, polymers and copolymers of acrylonitrile, copolymers of vinylidene chloride and vinyl chloride, polyolefins and the like. Various common packaging materials such as the numerous forms of paper products known as boxboard, cardboard, paperboard, paper sheets, and the like may also function as substrates for the latex foam. Especially desirable drapery articles are obtained by the process of the present invention.

Thus by the process of this invention, advantageous latex foam products are obtained which are white, soft and resilient, and which are resistant to deleterious effects from washing in hot, soapy water, or from dry cleaning with solvents usually used therefor, or from prolonged exposure to sunlight and heat. When applied to a woven or non-woven fabric, the latex foam serves to hold the fabric in its original shape, to prevent slippage of the warp and woof, to prevent shrinkage or loss of thread especially during such handling procedures as laundry and dry cleaning.

Foam-coated fabrics obtained by the practice of this invention have better hand, improved appearance, less wrinkling and improved drape.

The following examples illustrate how the invention may be practiced but are not to be construed as limiting its scope. In the examples, all parts and percentages are by weight unless otherwise specified.

Example 1.—A latex was prepared from a mixture of 86.6 parts of n-butyl acrylate, 5 parts of acrylonitrile, 5 parts of 2-hydroxyethyl acrylate, 0.4 part of ethylene dimethacrylate and 3 parts of methacrylic acid by the following procedure:

A solution of 48 parts of water, 0.33 part of sodium lauryl sulfate, and 0.23 part of sodium sulfate was heated in a reactor to about 45° C. and after the system was purged with nitrogen, 0.23 part of sodium persulfate, and 0.03 part of sodium bisulfite were added, the continuous feeding of the monomer mixture was started at a rate of 10 percent per hour. After one-half an hour, another continuous stream at the rate of 10 percent per hour was started consisting of 10 parts of water, 3.0 parts of sodium lauryl sulfate and 0.18 part of sodium bisulfite. After completion of the feeding of the continuous stream, the reaction was allowed to continue until the monomer content was less than 0.6 percent, then the resulting product was allowed to cool. The latex had a solids content of 60 percent and a pH of 3.3.

Example 2.—A 50 percent solution was prepared from water and a low molecular weight, heat settable, melamine-formaldehyde resin in the form of a free-flowing, dry, white powder. The solution had a pH of 9.3, a density of 1.2 grams per cubic centimeter and a viscosity (Stormer) at 20° C. of 30 centipoises. Twelve parts by weight of the solution (6 parts by weight of resin, dry basis) was blended with 167 parts of the latex of Example 1 (100 parts, dry basis). With the resulting modified, aqueous copolymer dispersion were blended 6.0 parts of sodium lauryl sulfate, 0.6 part of sodium polyacrylate, 6 parts of zinc oxide (as a 60 percent aqueous dispersion), 80 parts of hydrated alumina and 0.25 part of methyl cellulose, 4000 cps. grade (as a 2.5 percent aqueous solution). The resulting blend was frothed by whipping with a kitchen-type mixer (Hobart Kitchen-Aid, Model N-50) to four times the original volume. The wet froth was cast at a thickness of 0.13 inch on bleached cotton muslin, then heated at 140–145° C. for 5 minutes in a forced draft oven.

The textile-backed foam article was soft, resilient and had good hand. These articles could be ironed to remove wrinkles with the upper temperature being limited by the cloth rather than the foam layer.

Different samples of the articles were subjected to representative laundry and dry cleaning tests and passed such tests without abrading, delaminating or otherwise being damaged by the cleaning process. The dry cleaning tests were of two types: (1) a standard cycle of commercial coin-operated dry-cleaning machine using perchloroethylene as the dry cleaning solvent and (2) processing by a commercial dry cleaning shop using naphtha as solvent and their customary dry cleaning procedure. The laundry test consisted of putting the sample through the standard 30 minute washing cycle in an automatic home model washing machine with the water at 165° F. and using a built alkyl aryl sulfonate detergent.

Additional textile-backed foam articles were prepared in the same manner except that the thickness of the foam layer was twice as great; hence 20 minutes in the oven were used for the drying and curing step. Similar advantageous properties were noted.

Examples 3–7.—Other latexes were prepared by a method substantially the same as described in Example 1 except that different monomer compositions were used. Latex foam articles were prepared therefrom in the same manner as described for Example 2. Sections of the resulting foam-backed textile articles were subjected to the laundering and dry cleaning tests described in Example 2. The compositions and results are shown in Table I. Included also in Table I are data for comparative product M (not an example of the invention).

TABLE I

| | Example No. | | | | | |
|---|---|---|---|---|---|---|
| | 3 | 4 | 5 | 6 | 7 | M [1] |
| Composition: | | | | | | |
| n-Butyl acrylate | 81 | 91.6 | 82.4 | 88.5 | 90.6 | 91.6 |
| Methacrylic acid | 3 | 2 | 7 | 3 | | 3 |
| Acrylic acid | | | | | 4.2 | |
| 2-hydroxyethyl acrylate | 5 | 3 | 9.5 | | 5 | |
| 2-hydroxyethyl methacrylate | | | | 7.5 | | |
| Acrylonitrile | 10 | 3 | | | | 5 |
| Ethylene glycol dimethacrylate | 1 | 0.4 | 1.1 | 1 | | 0.4 |
| Triethylene glycol diacrylate | | | | | 0.2 | |
| Tests: | | | | | | |
| Laundering | P | P | P | P | P | F |
| Dry cleaning-perchloroethylene | P | P | B | B | F | F |
| Dry cleaning-naphtha | P | P | P | P | P | B |

[1] Not an example of the invention.
NOTE.—P=passed; B=borderline; F=failed.

Similarly satisfactory textile-backed foam articles were made by substituting for the cotton muslin as the textile backing other commercially available dry goods including denim, cotton flannel suede, percale, shrink-proofed wool, woven glass fibers and cloth made from various synthetic fibers, including polyethylene terephthalate, a copolymer of vinyl chloride and acrylonitrile, a copolymer predominantly of vinylidene chloride, and blends of cotton-rayon, and cotton-polyvinyl chloride.

Example 8.—Another portion of the same latex was mixed with the same kind of melamine-formaldehyde resin and formulating ingredients, all in the same proportions and in the same manner, as described in Example 2. The resulting blend was not frothed but was spread as a thin coating on the back of a tufted rayon and cotton upholstery fabric with a wire-wound spreading rod. The wet, coated fabric, held in place by a tentering frame, was dried and the composition was cured by heating in an oven at 140° C. for 3 minutes. The resulting backcoated upholstery fabric was found to have good tuft lock, high wear resistance, and very good resistance to dry cleaning solvents including perchloroethylene.

That which is claimed is:

1. In a method for preparing a latex foam by the steps comprising
   (1) blending a reactive latex with an organic coreactive material,
   (2) foaming the resulting blend to form a wet froth,
   (3) drying and curing the wet froth, the improvement consisting of using, as the latex,
      a film-forming latex containing copolymerized monomers consisting essentially of
         (a) from about 2 percent to about 7.5 percent of an $\alpha,\beta$-ethylenically unsaturated aliphatic carboxylic acid,
         (b) from about 2 percent to about 10 percent of a mono(hydroxyalkyl) ester of an $\alpha,\beta$ - ethylenically unsaturated carboxylic acid,
         (c) from about 57.5 percent to about 93 percent of at least one alkyl ester of an $\alpha,\beta$-ethylenically unsaturated carboxylic acid, a predominant portion of said alkyl ester having from 1 to 4 carbon atoms in the alkyl moiety,
         (d) from 0 to about 20 percent of an acrylonitrile, and
         (e) from about 0.4 percent to about 5 percent of a polyethylenically unsaturated crosslinking monomer capable of polymerizing under free radical conditions to covalently bond different chains of a polymer;
   all percentages being by weight based on the total copolymer weight;
   and for the organic coreactive material an amine-formaldehyde resin or a liquid epoxy resin which is a reaction product of epichlorohydrin and 2,2-bis-(p-hydroxyphenyl) propane;

the organic coreactive material being used in an amount of from about 1 part to about 10 parts for each 100 parts of copolymer in the latex.

2. The method of claim 1 in which the coreactive material is an amine-aldehyde resin.

3. A method according to claim 1 in which the amount of the unsaturated carboxylic acid is from about 3 percent to about 5 percent, the amount of the hydroxyalkyl ester is from about 5 percent to about 8 percent, the amount of the alkyl ester is from about 76 percent to about 86.6 percent, the amount of the acrylonitrile is from about 5 percent to about 10 percent, and the amount of the crosslinking monomer is from about 0.4 percent.

4. A method according to claim 3 in which the organic coreactive material is an amine-formaldehyde resin.

5. A method according to claim 4 in which the amine-formaldehyde resin is a melamine-formaldehyde resin.

6. A method according to claim 4 in which the ethylenically unsaturated aliphatic carboxylic acid is methacrylic acid.

7. A method according to claim 4 in which the ethylenically unsaturated aliphatic carboxylic acid is acrylic acid.

8. A latex foam prepared by the method of claim 1.

References Cited

UNITED STATES PATENTS

| 3,082,184 | 3/1963 | Falgiatore et al. | 260—851 |
| 3,245,932 | 4/1966 | Glavis | 260—851 |
| 3,311,582 | 3/1967 | Sparks | 260—29.4U |
| 3,352,806 | 11/1967 | Hicks | 260—851 |
| 3,375,227 | 3/1968 | Hicks | 260—851 |
| 3,215,647 | 11/1965 | Dunn | 260—2.5 |

MURRAY TILLMAN, Primary Examiner

M. FOELAK, Assistant Examiner

U.S. Cl. X.R.

260—41, 41.5, 78.5, 80.75, 80.8, 80.81, 837, 851, 855, 856; 117—126, 138.8, 140, 141, 143, 161

PO-1050
(5/69)

UNITED STATES PATENT OFFICE
CERTIFICATE OF CORRECTION

Patent No. 3,598,770        Dated   10 August 1971

Inventor(s)  Carl Moore and Donald B. Parrish

It is certified that error appears in the above-identified patent and that said Letters Patent are hereby corrected as shown below:

In column 4, line 40, change "methylisopropyl" to --methylisopropenyl--

In column 11, line 15, after "0.4 percent" add -- to about 1 percent --

Signed and sealed this 28th day of March 1972.

(SEAL)
Attest:

EDWARD M. FLETCHER, JR.        ROBERT GOTTSCHALK
Attesting Officer              Commissioner of Patents